(12) United States Patent
Sato et al.

(10) Patent No.: US 6,727,561 B2
(45) Date of Patent: Apr. 27, 2004

(54) SURFACE SHAPE RECOGNITION SENSOR AND METHOD OF MANUFACTURING THE SAME

(75) Inventors: Norio Sato, Kanagawa (JP); Katsuyuki Machida, Kanagawa (JP); Satoshi Shigematsu, Kanagawa (JP); Hiroki Morimura, Kanagawa (JP); Hakaru Kyuragi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/299,523

(22) Filed: Nov. 19, 2002

(65) Prior Publication Data

US 2003/0094663 A1 May 22, 2003

Related U.S. Application Data

(62) Division of application No. 10/061,045, filed on Jan. 30, 2002, now Pat. No. 6,518,083.

(30) Foreign Application Priority Data

Jan. 31, 2001 (JP) .......................................... 2001-022849
Jul. 24, 2001 (JP) .......................................... 2001-222584

(51) Int. Cl.[7] ............................................. H01L 29/82
(52) U.S. Cl. ..................... 257/414; 257/415; 257/416
(58) Field of Search ................................ 257/415, 416, 257/417, 414, 418, 419, 420, 421, 433, 434, 459, 534, 252; 438/53, 239, 54, 52, 58, 50, 275; 382/124

(56) References Cited

U.S. PATENT DOCUMENTS

| 6,060,756 | A | * | 5/2000 | Machida et al. ............ 257/415 |
| 6,248,655 | B1 | * | 6/2001 | Machida et al. ............ 438/597 |
| 6,310,371 | B1 | * | 10/2001 | Hung ......................... 257/252 |
| 6,329,251 | B1 | * | 12/2001 | Wu ............................. 438/275 |
| 6,352,874 | B1 | * | 3/2002 | McNeil et al. ................ 438/53 |
| 6,518,083 | B2 | * | 2/2003 | Sato et al. ..................... 438/50 |
| 6,532,824 | B1 | * | 3/2003 | Ueno et al. ................... 73/780 |

FOREIGN PATENT DOCUMENTS

| JP | 61-221883 | 10/1986 |
| JP | 5-061965 | 3/1993 |
| JP | 7-168930 | 7/1995 |
| JP | 2000-199701 | 7/2000 |

OTHER PUBLICATIONS

Yoshimasa Shimizu et al., "A Study on the Structure of a Smart Card with the Function to Verify the Holder", Technical Report of IEICE OFS92–32, pp. 25–30 (1992–11).

(List continued on next page.)

*Primary Examiner*—Jack Chen
*Assistant Examiner*—Laura M Schillinger
(74) *Attorney, Agent, or Firm*—Blakely, Sokoloff, Taylor & Zafman

(57) ABSTRACT

A surface shape recognition sensor includes a plurality of capacitive detection elements, a support electrode, and a protective film. The capacitive detection elements are formed from lower electrodes and a deformable plate-like upper electrode made of a metal. The lower electrodes are insulated and isolated from each other and stationarily laid out on a single plane of an interlevel dielectric formed on a semiconductor substrate. The upper electrode is laid out above the lower electrodes at a predetermined interval and has a plurality of opening portions. The support electrode is laid out around the lower electrodes while being insulated and isolated from the lower electrodes, and formed to be higher than the lower electrodes to support the upper electrode. The protective film is formed on the upper electrode to close the opening portions. The opening portions of the upper electrode are laid out in a region other than regions on a main part of the lower electrode and on the support electrode. A method of manufacturing the surface shape recognition sensor is also disclosed.

6 Claims, 12 Drawing Sheets

OTHER PUBLICATIONS

Marco Tartagni and Robert Guerrieri, A 390dpi Live Fingerprint Imager Based on Feedback Capacitive Sensing Scheme, 1997 IEEE International Solid–State Circuits Conference, pp. 200–201 (1997).

P. Rey, P. Charvet, M.T. Delaye, and S. Abouhassan, "A High Density Capacitive Pressure Sensor Application", proceedings of Transducers '97, pp. 1453–1456 (1997).

* cited by examiner $d-t = \text{constant}, \quad t_1 < t_2 < t_3, \quad d_1 < d_2 < d_3$ t=constant, $d_1 < d_2 < d_3$
Elastic deformation range of Upper electrode $0 < x < d_2 - t$ t=constant, d=constant  $\varepsilon_3 < \varepsilon_2 < \varepsilon_1$
$\varepsilon = \varepsilon_1$ 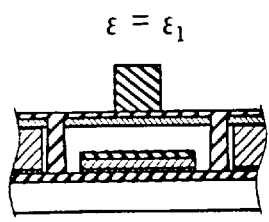
$\varepsilon = \varepsilon_2$ 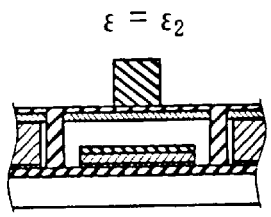
$\varepsilon = \varepsilon_3$ 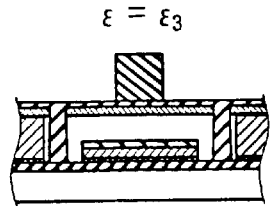
Fig. 12A         Fig. 12B         Fig. 12C
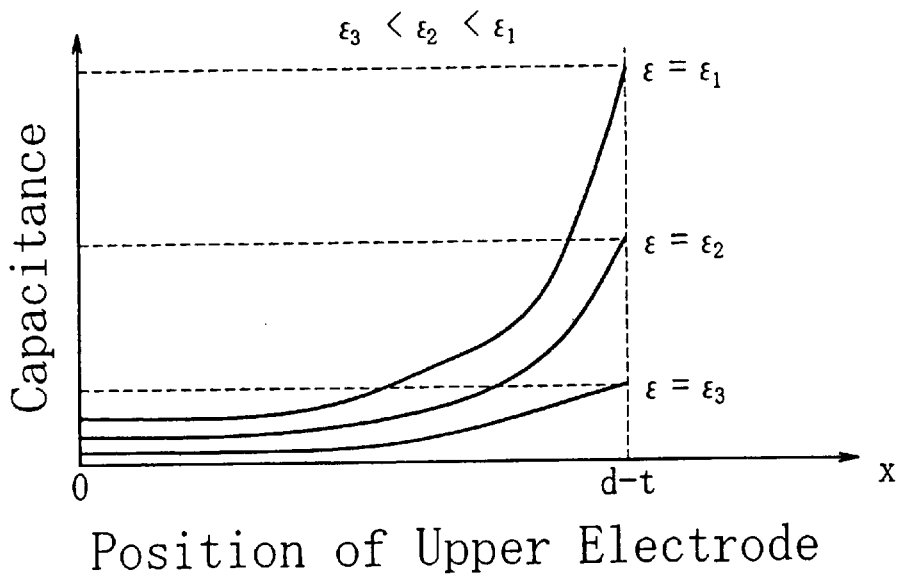
Fig. 12D

SURFACE SHAPE RECOGNITION SENSOR AND METHOD OF MANUFACTURING THE SAME

The present patent application is a Divisional of application Ser. No. 10/061,045, filed Jan. 30, 2002 now U.S. Pat. No. 6,518,083.

BACKGROUND OF THE INVENTION

The present invention relates to a surface shape recognition sensor used to sense a surface shape having a fine three-dimensional pattern such as a human fingerprint or animal noseprint.

Along with the progress in information-oriented society in the environment of the current society, the security technology has received a great deal of attention. For example, in the information-oriented society, a personal authentication technology for establishment of, e.g., an electronic cash system is an important key. Authentication technologies for preventing theft or illicit use of credit cards have also been extensively researched and developed (e.g., Yoshimasa Shimizu et al., "A Study on the Structure of a Smart Card with the Function to Verify the Holder", Technical Report of IEICE OFS92-32, pp. 25–30 (1992-11)).

There are various kinds of authentication schemes such as fingerprint authentication and voice authentication. Especially, many fingerprint authentication techniques have been developed so far. Fingerprint authentication schemes are roughly classified into an optical reading scheme and a scheme of using the human electric characteristic and detecting the three-dimensional pattern of the skin surface of a finger and replacing it with an electrical signal.

In the optical reading scheme, fingerprint data is read mainly using reflection of light and an image sensor (CCD) and collated (e.g., Seigo Igaki et al., Japanese Patent Laid-Open No. 61-221883). A scheme of reading a pressure difference by the three-dimensional pattern of the skin surface of a finger using a piezoelectric thin film has also been developed (e.g., Masanori Sumihara et al., Japanese Patent Laid-Open No. 5-61965).

An authentication scheme of replacing a change in electric characteristic due to contact of a skin with an electrical signal distribution by detecting a resistive or capacitive change amount using a pressure sensitive sheet so as to detect a fingerprint has also been proposed (e.g., Kazuhiro Itsumi et al., Japanese Patent Laid-Open No. 7-168930).

In the above prior arts, however, the optical reading scheme is difficult to make a compact and versatile system, and its application purpose is limited. The scheme of detecting the three-dimensional pattern of the skin surface of a finger using a pressure sensitive sheet or the like is difficult to put into practical use or is unreliable because a special material is required and fabrication is difficult.

"Marco Tartagni" et al. have developed a capacitive fingerprint sensor using an LSI manufacturing technology (Marco Tartagni and Robert Guerrieri, A 390 dpi Live Fingerprint Imager Based on Feedback Capacitive Sensing Scheme, 1997 IEEE International Solid-State Circuits Conference, pp. 200–201 (1997)).

In this fingerprint sensor, the three-dimensional pattern of a skin is detected using a feedback static capacitance scheme by a sensor chip in which small capacitive detection sensors are two-dimensionally arrayed.

In the capacitive detection sensor, two plates are formed on the uppermost layer of an LSI, and a passivation film is formed on the plates. In this capacitive detection sensor, a skin surface functioning as a third plate is isolated by an insulating layer formed from air, and sensing is performed using the difference in distance, thereby detecting a fingerprint. As characteristic features of a fingerprint authentication system using this structure, no special interface is necessary, and a compact system can be constructed, unlike the conventional optical scheme.

In principle, a fingerprint sensor using a capacitive detection sensor is obtained by forming a lower electrode on a semiconductor substrate and forming a passivation film on the resultant structure. A capacitance between the skin and the sensor is detected through the passivation film, thereby detecting the fine three-dimensional pattern of the skin surface of a finger.

In this sensor chip using capacitive detection sensors, however, since a skin serves as one electrode for capacitive detection, static electricity generated at the fingertip readily causes electrostatic destruction in an integrated circuit such as a sensor circuit incorporated in the sensor chip.

To prevent the above-described electrostatic destruction of an electrostatic capacitance fingerprint sensor, a surface shape recognition sensor having an electrostatic capacitive detection sensor having a sectional structure as shown in FIG. 15 has been proposed. The sensor shown in FIG. 15 will be described. The sensor has a lower electrode 1503 formed on a semiconductor substrate 1501 via an interlevel dielectric 1502, a plate-shaped deformable upper electrode 1504 which is separated from the lower electrode 1503 at a predetermined interval, and a support electrode 1505 laid out around the lower electrode 1503 to support the upper electrode 1504 while being insulated and isolated from the lower electrode 1503.

In the sensor having the above arrangement, when a finger to be subjected to fingerprint detection comes into contact with the upper electrode 1504, the pressure from the finger deflects the upper electrode 1504 toward the lower electrode 1503 to change the electrostatic capacitance formed between the lower electrode 1503 and the upper electrode 1504. This change in electrostatic capacitance is detected by a detection circuit (not shown) on the semiconductor substrate 1501 through an interconnection (not shown) connected to the lower electrode 1503. In this surface shape recognition sensor, when the upper electrode 1504 is grounded through the conductive support electrode 1505, static electricity generated at the fingertip and discharged to the upper electrode 1504 flows to ground through the support electrode 1505. For this reason, the detection circuit incorporated under the lower electrode 1503 is protected from electrostatic destruction.

The above-described deformable upper electrode must be formed with a space under it. An example of a sensor using such a hollow structure is described in a "method of manufacturing a capacitive pressure sensor for detecting a change in pressure by a change in electrostatic capacitance" by "P. Rey et al." (reference 1: P. Rey, P. Charvet, M. T. Delaye, and S. Abouhassan, "A High Density Capacitive Pressure Sensor Array For Fingerprint Sensor Application", proceedings of Transducers '97, pp. 1453–1456 (1997)).

To form such a hollow structure, a lower electrode is formed, and then, a sacrificial film is formed on the lower electrode. An upper electrode and a deformable portion to which the upper electrode is fixed are formed on the sacrificial film. After that, the sacrificial film under the deformable portion is removed by etching from the sides of the edge portion of the deformable portion to which the upper electrode is fixed, thereby forming a space under the upper electrode. In such a fine hollow structure, however, since the height of the space under the deformable portion is as small as about 0.5 to 2 μm, though the deformable portion generally has a length of about 50 μm in the lateral direction, it is very difficult to completely remove the sacrificial film by etching from the lateral direction. Additionally, in the above-described surface shape recognition sensor, since a plurality of cells formed from a single lower electrode are arrayed, it is almost impossible to completely remove the sacrificial film by etching from the lateral direction.

To the contrary, when an opening portion is formed in the deformable portion formed on the sacrificial film, and the sacrificial film is removed by etching through the opening portion, the sacrificial film can be efficiently removed. Hence, the sacrificial film can be completely removed.

When the upper electrode serving as a deformable portion has an opening portion, a foreign substance or the like may enter the hollow structure from the opening portion to impede the detection operation of the sensor. This may also cause an error in the lower electrode. Hence, in such a surface shape recognition sensor, to close (seal) the opening portion, a protective film is formed on the upper electrode.

However, the opening portion poses a problem in forming a protective film for protecting the upper electrode on the upper electrode. As the protective film, an inorganic dielectric film such as a silicon oxide film or silicon nitride film is preferably used because of its characteristics. A film of such a material is generally formed by deposition such as CVD or sputtering. This method is easy to apply. However, when a protective film of an insulating material is formed on the upper electrode with an opening portion by, e.g., CVD, the insulating material enters the hollow structure from the opening portion of the upper electrode. When the insulating material enters the hollow structure to form a structure made of the insulating material, the sensor operation may be impeded by this structure in some cases.

SUMMARY OF THE INVENTION

The present invention has been made to solve the above problems, and has as its object to easily form a protective film on an upper electrode by a generally used method that is easy to apply in a surface shape recognition sensor for which a hollow structure can easily be formed by forming an opening portion in the upper electrode.

In order to achieve the above object, according to the present invention, there is provided a surface shape recognition sensor comprising a plurality of capacitive detection elements formed from lower electrodes and a deformable plate-like upper electrode made of a metal, the lower electrodes being insulated and isolated from each other and stationarily laid out on a single plane of an interlevel dielectric formed on a semiconductor substrate, and the upper electrode being laid out above the lower electrodes at a predetermined interval and having a plurality of opening portions, a support electrode laid out around the lower electrodes while being insulated and isolated from the lower electrodes, and formed to be higher than the lower electrodes to support the upper electrode, and a protective film formed on the upper electrode to close the opening portions, wherein the opening portions of the upper electrode are laid out in a region other than regions on a main part of the lower electrode and on the support electrode.

BRIEF DESCRIPTION OF THE DRAWINGS

FIGS. 12A to 12C are schematic sectional views for explaining the operative states of a surface shape recognition sensor according to still another embodiment of the present invention;

FIG. 12D is a graph showing the characteristic of the surface shape recognition sensor according to the embodiment shown in FIGS. 12A to 12C;

DESCRIPTION OF THE PREFERRED EMBODIMENTS

The embodiments of the present invention will be described below with reference to the accompanying drawings.

<First Embodiment>

Figure 1A:
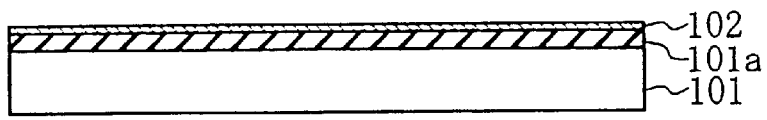
FIGS. 1A to 1G are views for explaining a method of manufacturing a surface shape recognition sensor according to an embodiment of the present invention.

FIGS. 1A to 3B explain a method of manufacturing a surface shape recognition sensor according to an embodiment of the present invention. The manufacturing method will be described below with reference to FIGS. 1A to 3B. First, as shown in FIG. 1A, an interlevel dielectric 101a is formed on a substrate 101 made of a semiconductor material such as silicon. Another integrated circuit such as a detection circuit (not shown) having an interconnection structure with a plurality of interconnections is formed on the substrate 101 under the interlevel dielectric 110a.

After formation of the interlevel dielectric 101a, a seed layer 102 having a two-layered structure including a 0.1-$\mu$m thick titanium film and a 0.1-$\mu$m thick gold film is formed by vapor deposition or the like.

Figure 1B:
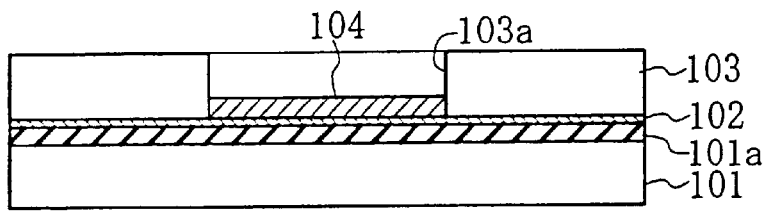

Next, as shown in FIG. 1B, a 5-$\mu$m thick resist pattern 103 having an opening portion 103a is formed on the seed layer 102. The resist pattern 103 is formed by known photolithography. After the resist pattern 103 is formed, a 1-$\mu$m thick metal pattern 104 formed from a gold plating film is formed on the seed layer 102 exposed to the opening portion 103a by electroplating.

Figure 1C:
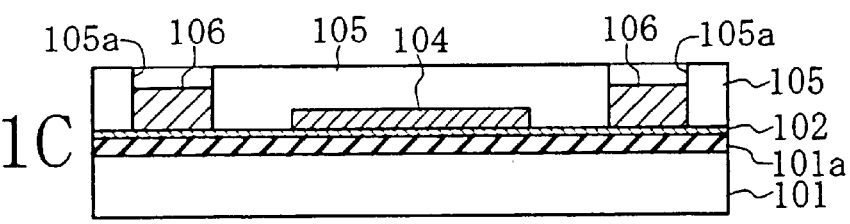

After the resist pattern 103 is removed, a 5-$\mu$m thick resist pattern 105 having an opening portion 105a is newly formed, as shown in FIG. 1C. At this time, the metal pattern 104 is covered with the resist pattern 105. After the resist pattern 105 is formed, a 3-$\mu$m thick metal pattern 106 formed from a gold plating film is formed on the seed layer 102 exposed to the opening portion 105a by electroplating.

After the resist pattern 105 is removed, the seed layer 102 is selectively etched using the metal patterns 104 and 106 as a mask. In this etching, first, the upper layer of the seed layer 102, i.e., the gold film is selectively removed using an etchant containing iodine, ammonium iodide, water, and ethanol. Next, the lower layer of the seed layer 102, i.e., the titanium film is selectively removed using an HF-based etchant. In wet etching of gold, the etching rate is 0.05 $\mu$m/min.

Figure 1D:
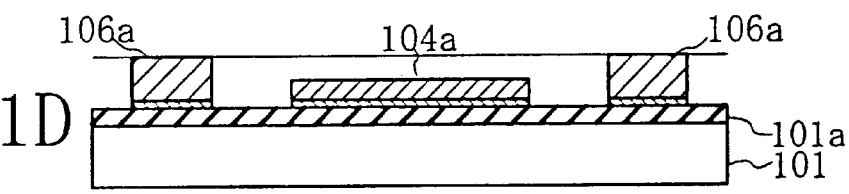

As a result, as shown in FIG. 1D, a lower electrode 104a with an upper layer formed from gold and a support electrode 106a insulated and isolated from the lower electrode 104a are formed on the substrate 101. The support electrode 106a supports a deformable electrode (upper electrode) (to be described later) and is formed in, e.g., a lattice shape on the substrate 101, as shown in the plan view of FIG. 1G. A plurality of lower electrodes 104a are respectively laid out in the central portions of regions surrounded by the lattice-shaped support electrode 106a. The shape of the support electrode 106a is not limited to the lattice shape. For example, a plurality of support electrodes each having a rectangular columnar shape with a square bottom surface may be laid out around each lower electrode 104a (e.g., on lines extended from four corners).

Figure 1E:
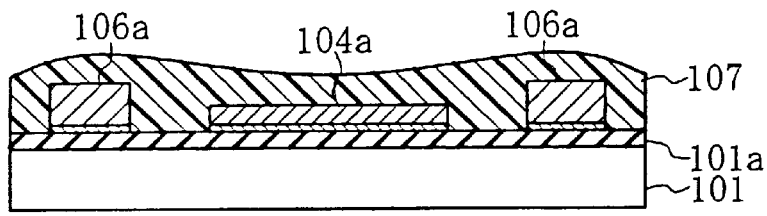

As shown in FIG. 1E, a photosensitive resin film 107 is formed on the substrate 101 by spin coating to cover the lower electrode 104a and support electrode 106a. The resin film 107 has a positive photosensitivity. The resin film 107 is prepared by, e.g., adding a positive photosensitive material to a base resin such as polyamide, polyamide acid, or polybenzoxazole (or a precursor thereof).

The resultant resin film 107 is heated by keeping the substrate 101 placed on a hot plate heated to about 120? C. for about 4 min.

Figure 1F:
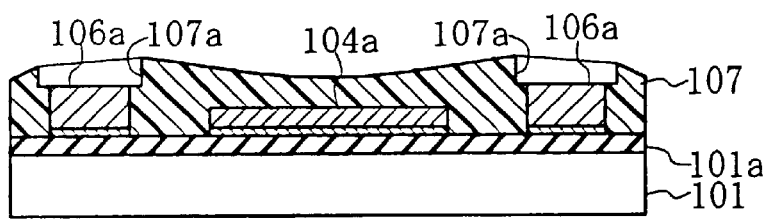
Figure 1G:
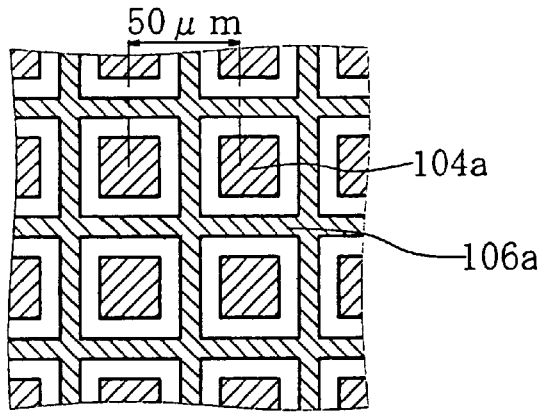

Next, the region on the support electrode 106a is exposed by known photolithography. Subsequently, development processing is executed, thereby forming, in the resin film 107, an opening portion 107a to which the upper portion of the support electrode 106a is exposed, as shown in FIG. 1F. After development processing, the resin film 107 is heated to about 310? C. and thermally cured.

Figure 2A:
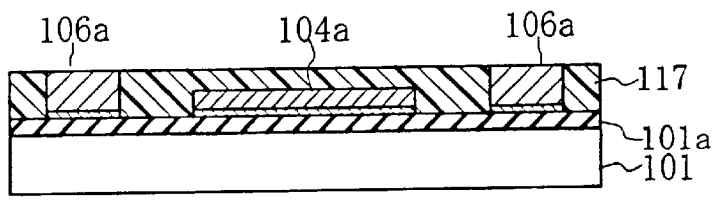
FIGS. 2A to 2F are views for explaining the method of manufacturing the surface shape recognition sensor according to the embodiment of the present invention.

The cured resin film 107 is etched back by chemical mechanical polishing to form a sacrificial film 117 having a flat surface, as shown in FIG. 2A. At this time, the upper surface of the support electrode 106a is almost flush with the surface of the sacrificial film 117. The upper surface of the support electrode 106a is exposed.

Figure 2B:
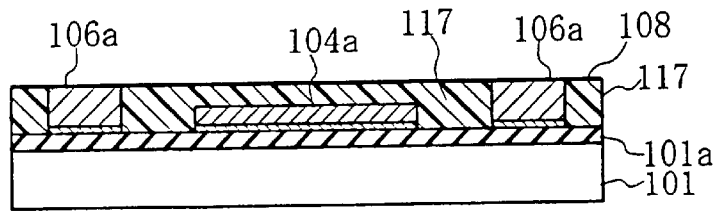

As shown in FIG. 2B, a seed layer 108 having a two-layered structure including a 0.1-$\mu$m thick titanium film and a 0.1-$\mu$m thick gold film is formed by vapor deposition or the like on the sacrificial film 117 which is flattened to expose the upper surface of the support electrode 106a.

Figure 2C:
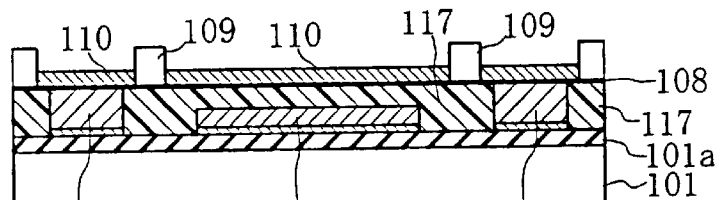

As shown in FIG. 2C, a resist pattern 109 is formed. A 0.4-$\mu$m thick metal film 110 formed from a gold plating film is formed on the seed layer 108 exposed to the region without the resist pattern 109 by electroplating. After the resist pattern 109 is removed, the seed layer 108 is selectively etched and removed using the formed metal film 110 as a mask.

In this etching, first, the upper layer of the seed layer 108, i.e., the gold film is selectively removed using an etchant containing iodine, ammonium iodide, water, and ethanol. Next, the lower layer of the seed layer 108, i.e., the titanium film is selectively removed using an HF-based etchant. In wet etching of gold, the etching rate is 0.05 $\mu$m/min.

Figure 2D:
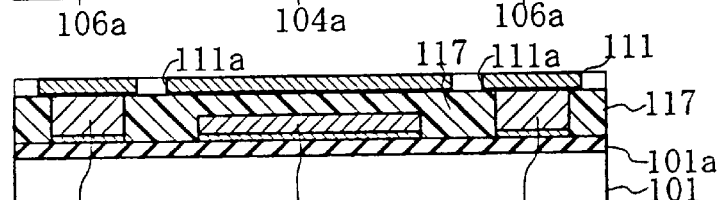
Figure 2E:
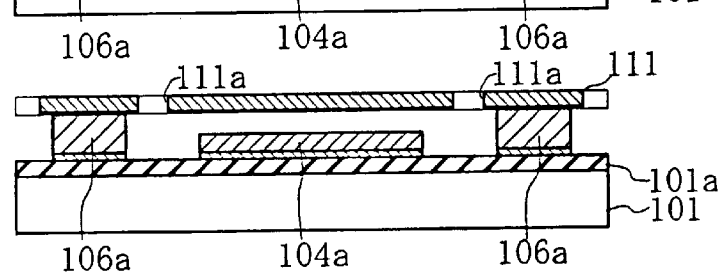
Figure 2F:
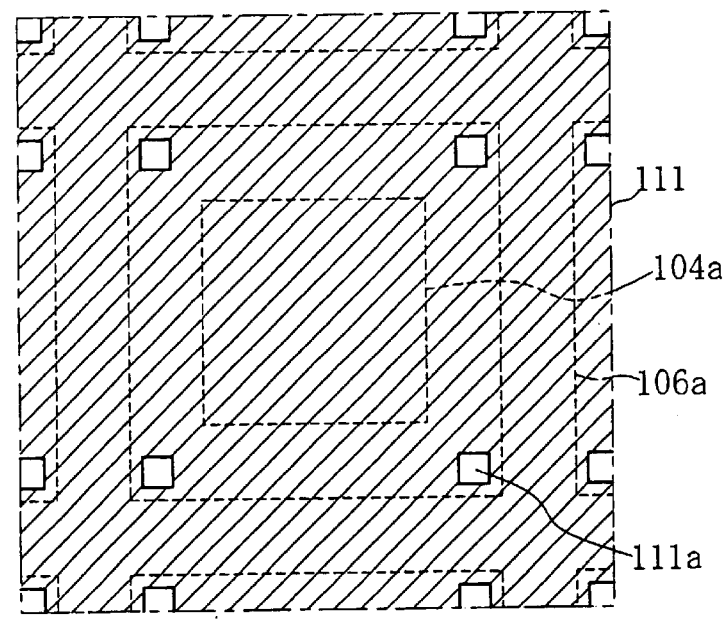

As a result, as shown in FIG. 2D, a deformable electrode (upper electrode) 111 having a plurality of opening portions 111a is formed. As shown in FIG. 2F, the opening portions 111a are formed at the four corners of a rectangular region surrounded by the lattice-shaped support electrode 106a. The opening portions 111a need not always be formed at the four corners of the opening region of the lattice and only need be laid out on the region between the support electrode 106a and the lower electrode 104a. In other words, the opening portions 111a only needs to be laid out in a region other than the regions on the support electrode 106a and lower electrode 104a. The opening portions 111a are preferably separated from the region on the lower electrode 104a as far as possible but preferably do not overlap the support electrode 106a.

The substrate 101 with the completed deformable electrode 111 is exposed to a plasma mainly containing oxygen gas. An etching species generated by the plasma is brought into contact with the sacrificial film 117 through the opening portions 111a to remove the sacrificial film 117. Consequently, as shown in FIG. 2E, a space is formed under the deformable electrode 111 which is supported by the support electrode 106a. A structure in which the deformable electrode 111 and lower electrode 104a are separated by the space is formed.

Figure 3A:
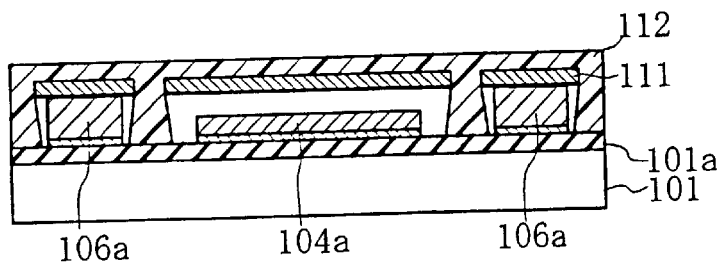
FIGS. 3A and 3B are views for explaining the method of manufacturing the surface shape recognition sensor according to the embodiment of the present invention.

As shown in FIG. 3A, polyimide is coated to the deformable electrode 111 and thermally cured to form a protective film 112 having a thickness of about 1 $\mu$m. Thermal curing is executed at 300? C. for 30 min. Since the deformable electrode 111 has the opening portions 111a, the coated polyimide partially enters the space under the deformable electrode 111 from the opening portions 111a. However, since the opening portions 111a are formed not on the lower electrode 104a but near the support electrode 106a, the part of polyimide that has entered the space does not enter the space on the lower electrode 104a.

Figure 3B:
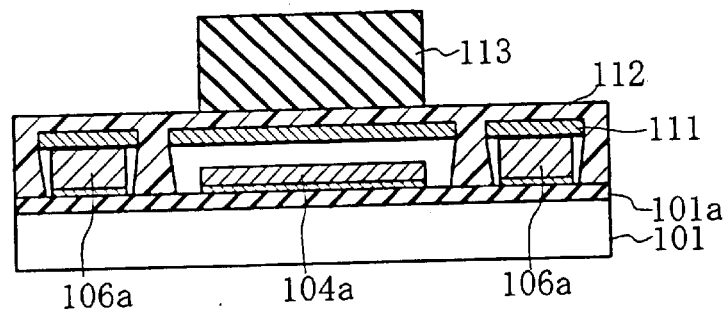

Next, as shown in FIG. 3B, a projection 113 is formed in a region of the protective film 112 above the lower electrode 104a. The projection 113 is formed by forming a 5- to 10-μm thick photosensitive polyimide film, exposing a region other than the structure formation region by known photolithography, developing the region, and annealing the resultant structure at about 300? C. for about 30 min to thermally cure the film.

In the surface shape recognition sensor formed in the above-described way, whose portion is shown in FIG. 3B, when a fingertip portion comes into contact with the protective film 112, the projection 113 is pressed downward in accordance with the skin surface shape of the finger in contact to deform the deformable electrode 111. Hence, the capacitance formed between the deformable electrode 111 and the lower electrode 104a changes. When halftone data is obtained in correspondence with the change in capacitance formed on each lower electrode 104a according to the skin surface shape, the skin surface shape can be reproduced. Capacitive detection or conversion into halftone data is done by, e.g., an integrated circuit (not shown) formed on the substrate 101.

In this embodiment, the protective film 112 is formed after the opening portions 111a are formed in the deformable electrode 111. However, the material of the protective film 112 does not enter the space on the lower electrode 104a. For this reason, even when the protective film 112 is formed, the state wherein the space without anything is formed between the deformable electrode 111 and the lower electrode 104a is held. Hence, the deformable electrode 111 can be deformed by a downward force applied to the projection 113.

As described above, according to this embodiment, in the surface shape recognition sensor in which a hollow structure can easily be formed by forming the opening portions in the deformable electrode 111, as shown in FIG. 3B, the protective film can more easily be formed on the deformable electrode by a generally used method, i.e., coating of polyimide, that is easy to apply.

<Second Embodiment>

Another embodiment of the present invention will be described next. In the above embodiment, the protective film 112 is formed by coating polyimide. However, the present invention is not limited to this. For example, an inorganic insulating material such as silicon oxide may be formed by vapor deposition, as will be described below. The manufacturing process will be described below. First, as has been described with reference to FIGS. 1A to 2E, a space is formed under a deformable electrode 111 which is supported by a support electrode 106a such that the deformable electrode 111 and lower electrode 104a are separated by the space.

Figure 4A:
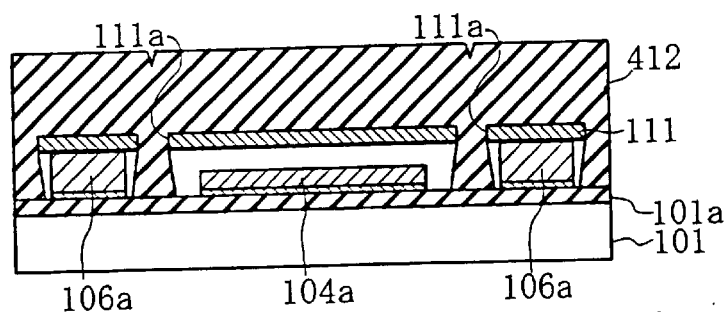
FIGS. 4A to 4C are views for explaining the method of manufacturing the surface shape recognition sensor according to the embodiment of the present invention.

Next, as shown in FIG. 4A, a 3-μm thick silicon oxide film 412 is formed on the deformable electrode 111. To form the silicon oxide film 412, CVD, plasma CVD, or ozone TEOS can be used. At the initial stage of formation of the silicon oxide film on the deformable electrode 111, the silicon oxide film is formed such that it is formed only almost immediately under opening portions 111a to immediately close the opening portions 111a. When the silicon oxide film 412 is formed thick, steps due to the presence of the opening portions 111a are reduced.

Figure 4B:
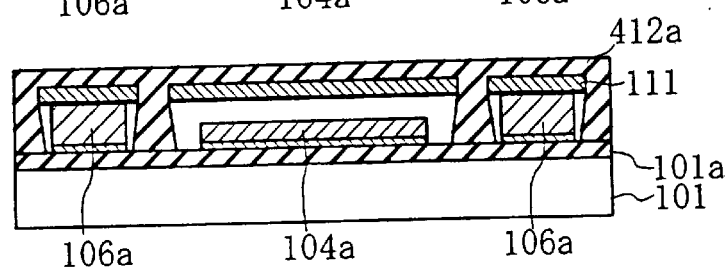
Figure 4C:
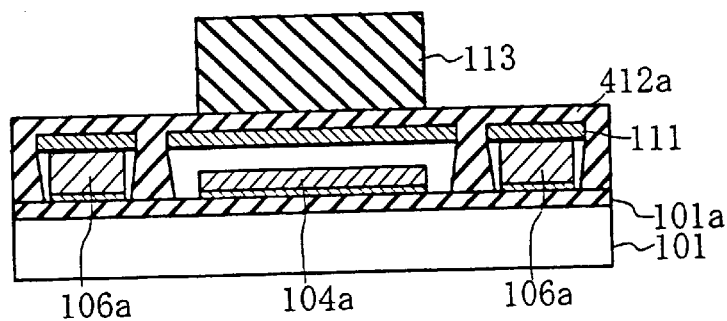

As shown in FIG. 4B, the silicon oxide film 412 is etched back by about 2 μm to form a 1-μm thick protective film 412a on the deformable electrode 111. As shown in FIG. 4C, a projection 113 is formed in a region of the protective film 412a above the lower electrode 104a.

As described above, in this embodiment as well, the protective film 412a can be formed on the deformable electrode 111, as in the above-described embodiment. In addition, even when the opening portions 111a are formed in the deformable electrode 111, the space under the deformable electrode 111 is sealed by the protective film 112 or 412a.

As described above, in this embodiment as well, in the surface shape recognition sensor for which a hollow structure can easily be formed by forming the opening portions in the deformable electrode 111, as shown in FIG. 4B or 4C, the protective film can more easily be formed on the deformable electrode by a generally used method, i.e., CVD, plasma CVD, or ozone TEOS, that is easy to apply.

<Third Embodiment>

In the surface shape recognition sensor shown in, e.g., FIG. 3B, if the pressure from an object such as a finger to be subjected to surface shape recognition is too large, the deformable electrode (upper electrode) may be excessively deflected and come into contact with the lower electrode to cause short-circuit. To prevent this, the upper surface of the lower electrode is covered with a dielectric film, as will be described below.

Main part of a method of manufacturing a surface shape recognition sensor according to this embodiment will be described below.

Figure 5A:
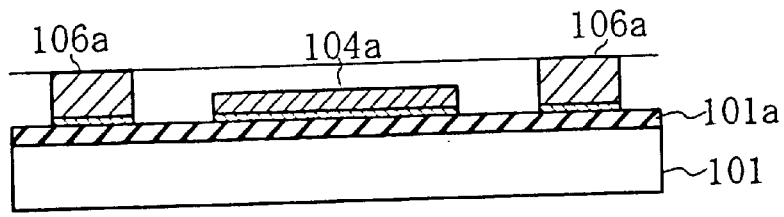
FIGS. 5A to 5E are views for explaining a method of manufacturing a surface shape recognition sensor according to another embodiment of the present invention.

First, the same processes as shown in FIGS. 1A to 1D are executed. Then, as shown in FIG. 5A, a lower electrode 104a having a gold upper layer and a support electrode 106a insulated and isolated from the lower electrode 104a are formed on a substrate 101.

Figure 5B:
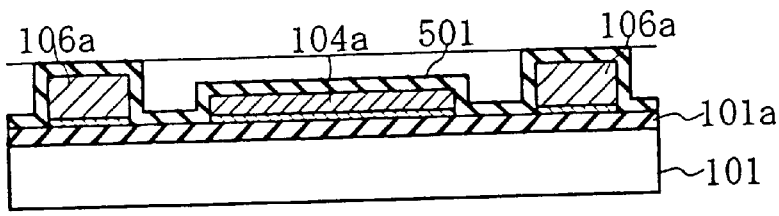

Next, as shown in FIG. 5B, a 0.1-μm thick dielectric film 501 made of a silicon oxide film is formed by ECR (Electron Cyclotron Resonance) plasma CVD (Chemical Vapor Deposition). The silicon oxide film is formed by using, as source gases, $SiH_4$ and $O_2$ gases and setting the flow rates of the gases to 10 and 20 sccm, respectively, and the microwave power to 200 W. The dielectric film 501 is not limited to a silicon oxide film. Instead, another insulating material such as a silicon nitride film may be used.

Figure 5C:
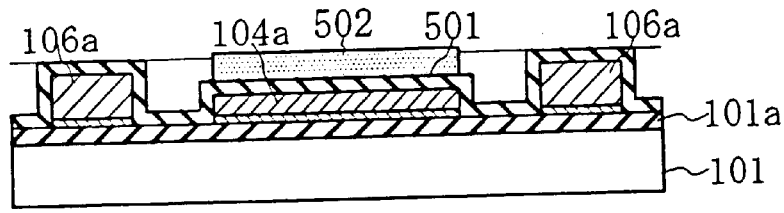
Figure 5D:
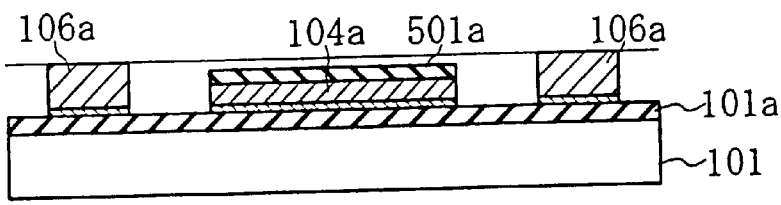

As shown in FIG. 5C, a 1-μm thick resist pattern 502 is formed in a region on the dielectric film 501 above the lower electrode 104a to entirely cover the lower electrode 104a. The resist pattern 502 is formed by known photolithography. After that, the dielectric film 501 is selectively etched using the resist pattern 502 as a mask. In this etching, dry etching is performed using $CHF_3$ gas and $O_2$ gas as etching gases. The gas flow rates are set to 30 and 5 sccm, and the microwave power is set to 300 W. As a result, an electrode dielectric film 501a that covers the lower electrode 104a is formed, as shown in FIG. 5D.

Figure 5E:
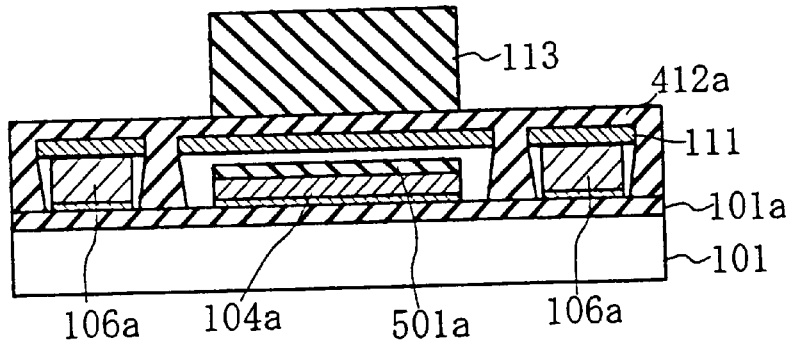

After this, in accordance with the same procedure as shown in FIGS. 1E to 3B, a deformable electrode 111 is formed in a region above the lower electrode 104a, a protective film 412a is formed to cover the deformable electrode 111, and a projection 113 is formed on the protective film 412a, as shown in FIG. 5E. Alternatively, in accordance with the same procedure as shown in FIGS. 1E to 2F and 4A to 4C, the deformable electrode 111 may be formed in a region above the lower electrode 104a, the protective film 412a may be formed to cover the deformable electrode 111, and the projection 113 may be formed on the protective film 412a, as shown in FIG. 5E.

According to this surface shape recognition sensor, the electrode dielectric film 501a is formed on the lower electrode 104a. Hence, even when the deformable electrode 111 is largely deflected downward, the lower portion of the deformable electrode 111 is prevented from coming into electrical contact with the lower electrode 104*a*.

To prevent the contact between the lower electrode 104*a* and the deformable electrode 111, the interval between these electrodes is increased more than necessity. This may decrease the resultant electrostatic capacitance and degrade the sensitivity. However, according to the surface shape recognition sensor shown in FIG. 5E, since the interval between the lower electrode and the deformable electrode can be reduced, the sensitivity is not degraded. When the interval is increased, and an excess pressure is applied to the deformable electrode 111 in this state, the deformable electrode 111 may cause plastic deformation and be unable to return to the original state. However, the surface shape recognition sensor shown in FIG. 5E can also suppress this problem.

In this embodiment as well, in the surface shape recognition sensor for which a hollow structure can easily be formed by forming the opening portions in the deformable electrode 111, the protective film can more easily be formed on the deformable electrode by a generally used method that is easy to apply.

Another method of manufacturing the electrode dielectric film will be described next.

Figure 6A:
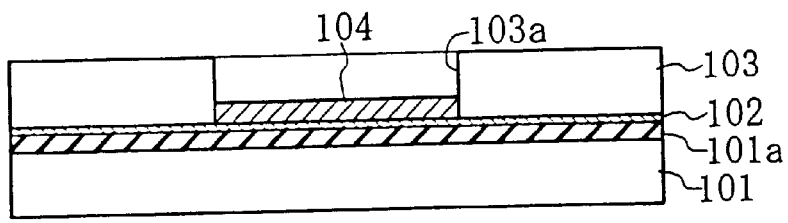
FIGS. 6A to 6F are views for explaining a method of manufacturing a surface shape recognition sensor according to still another embodiment of the present invention.

First, as in the above-described embodiments, a 5-$\mu$m thick resist pattern 103 having an opening portion 103*a* is formed on a seed layer 102, as shown in FIG. 6A. After the resist pattern 103 is formed, a 1-$\mu$m thick metal pattern 104 made of a gold plating film is formed on the seed layer 102 exposed to the opening portion 103*a* by electroplating.

Figure 6B:
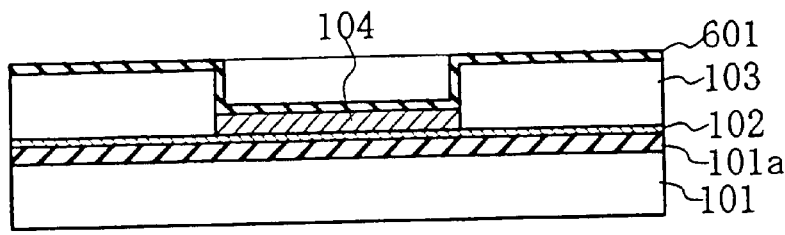

In this embodiment, after that, a 0.3-$\mu$m thick dielectric film 601 made of a silicon oxide film is formed using ECR plasma CVD without removing the resist pattern 103 (FIG. 6B). In this case as well, the silicon oxide film is formed by using, as source gases, $SiH_4$ and $O_2$ gases and setting the flow rates of the gases to 10 and 20 sccm, respectively, and the microwave power to 200 W.

Figure 6C:
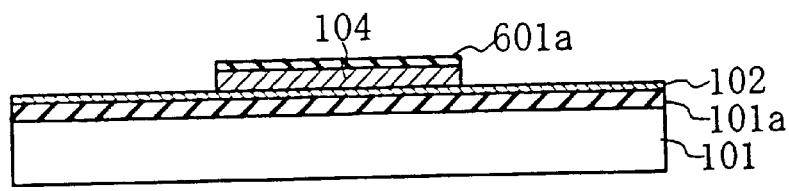
Figure 6D:
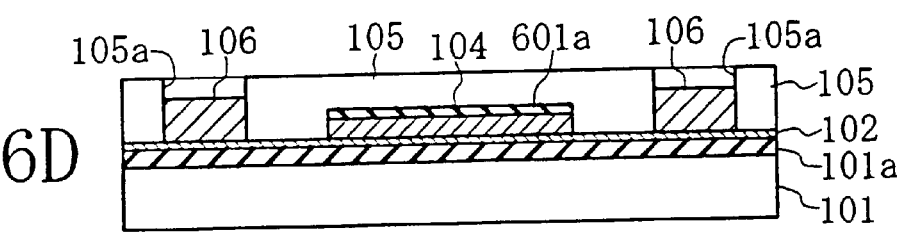
Figure 6E:
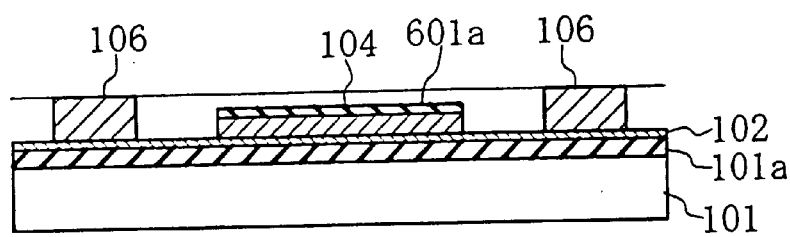

Next, the resist pattern 103 is removed. At this time, a portion of the dielectric film 601, which is in contact with the resist pattern 103, is removed by lift-off. Consequently, only a dielectric film 601*a* on the metal pattern 104 remains (FIG. 6C). After this, as in FIG. 1C, a resist pattern 105 is formed, and a metal pattern 106 made of a gold plating film is formed by electroplating (FIG. 6D). After that, the resist pattern 105 is removed (FIG. 6E).

The seed layer 102 is selectively etched using the formed metal patterns 104 and 106 as a mask. In this etching, first, the upper layer of the seed layer 102, i.e., the gold film is selectively removed using an etchant containing iodine, ammonium iodide, water, and ethanol. Next, the lower layer of the seed layer 102, i.e., the titanium film is selectively removed using an HF-based etchant. At this time, the dielectric film 601*a* is also etched by the HF-based etchant. However, since the thickness of the dielectric film 601*a* is 0.3 $\mu$m, the dielectric film 601*a* is not entirely removed while the 0.1-$\mu$m thick titanium film is completely etched. The dielectric film 601*a* remains as an electrode dielectric film 601*b* (to be described below).

Figure 6F:
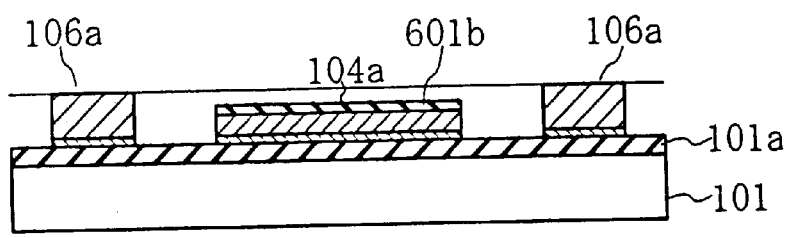

As a result, as shown in FIG. 6F, the lower electrode 104*a* having a gold upper layer, the electrode dielectric film 601*b* on the lower electrode 104*a*, and the support electrode 106*a* insulated and isolated from the lower electrode 104*a* and electrode dielectric film 601*b* are formed on the substrate 101.

FIG. 6F corresponds to the state shown in FIG. 5D. Then, in accordance with the same procedure as in FIGS. 1E to 3B, the surface shape recognition sensor shown in FIG. 5E is formed. Alternatively, in accordance with the same procedure as shown in FIGS. 1E to 2F and 4A to 4C, the surface shape recognition sensor as shown in FIG. 5E may be formed.

In this embodiment, a silicon oxide film has been exemplified as the dielectric film 601. However, any other insulating material such as a silicon nitride film may be used as long as it is not etched in etching the gold, titanium, and sacrificial films or it is etched only in a small amount.

According to this surface shape recognition sensor, the electrode dielectric film is formed on the lower electrode. Hence, even when the deformable electrode is largely deflected downward, the lower portion of the deformable electrode is prevented from coming into electrical contact with the lower electrode. To prevent the contact between the lower electrode and the deformable electrode, the interval between these electrodes is increased more than necessity. This may decrease the resultant electrostatic capacitance and degrade the sensitivity. However, according to the surface shape recognition sensor shown in FIG. 5E, since the interval between the lower electrode and the deformable electrode can be reduced, the sensitivity is not degraded. When the interval is increased, and an excess pressure is applied to the deformable electrode in this state, the deformable electrode may cause plastic deformation and be unable to return to the original state. However, the surface shape recognition sensor of this embodiment can also suppress this problem.

In this embodiment as well, in the surface shape recognition sensor for which a hollow structure can easily be formed by forming the opening portions in the deformable electrode, the protective film can more easily be formed on the deformable electrode by a generally used method that is easy to apply.

The electrode dielectric film may be formed in the following way.

Figure 7A:
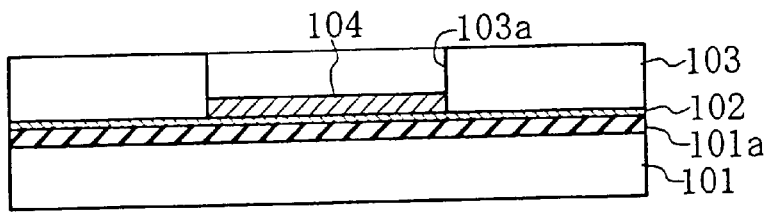
FIGS. 7A to 7G are views for explaining a method of manufacturing a surface shape recognition sensor according to still another embodiment of the present invention.
Figure 7B:
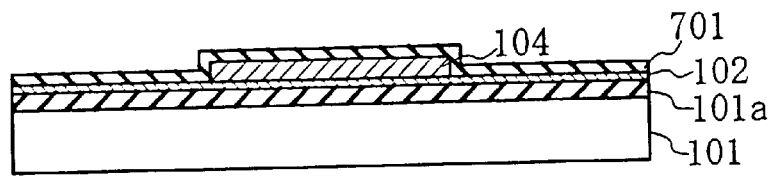

As in the above-described embodiments, the 5-$\mu$m thick resist pattern 103 having the opening portion 103*a* is formed on the seed layer 102, as shown in FIG. 7A. After the resist pattern 103 is formed, the 1-$\mu$m thick metal pattern 104 made of a gold plating film is formed on the seed layer 102 exposed to the opening portion 103*a* by electroplating.

In this embodiment, next, the resist pattern 103 is removed. Then, a 0.1-$\mu$m thick dielectric film 701 made of a silicon oxide film is formed on the seed layer 102 to cover the metal pattern 104. The dielectric film 701 is formed in accordance with the same procedure as that for the dielectric film 501 shown in FIG. 5B.

Figure 7C:
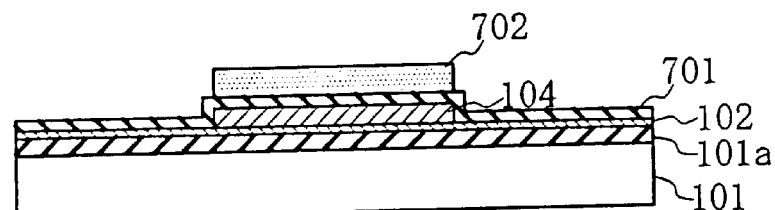
Figure 7D:
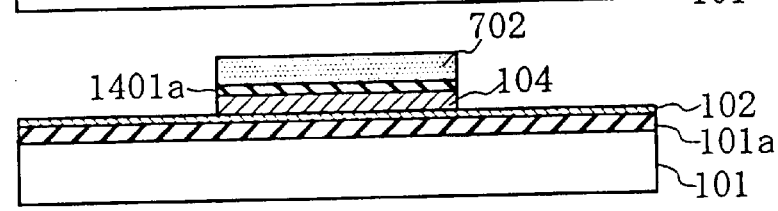
Figure 7E:
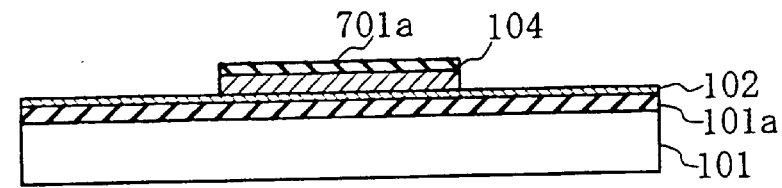

As shown in FIG. 7C, a 1.0-$\mu$m thick resist pattern 702 is formed on the metal pattern 104 in a region on the dielectric film 701 by known photolithography. After the resist pattern 702 is formed, the dielectric film 701 is selectively etched and removed using the resist pattern 702 as a mask (FIG. 7D). In this dry etching, $CHF_3$ gas and $O_2$ gas are used as etching gases, the gas flow rates are set to 30 and 5 sccm, respectively, and the microwave power is set to 300 W. Next, the resist pattern 702 is removed, thereby forming an electrode dielectric film 701*a* formed from a silicon oxide film on the metal pattern 104, as shown in FIG. 7E.

Figure 7F:
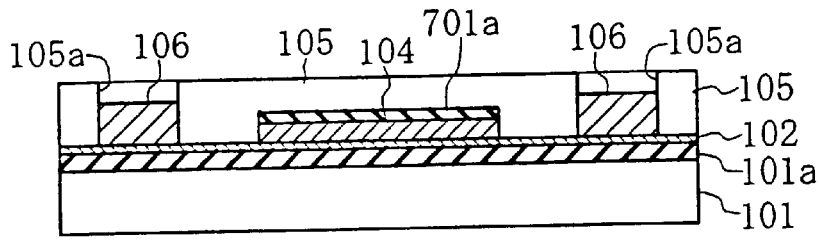
Figure 7G:
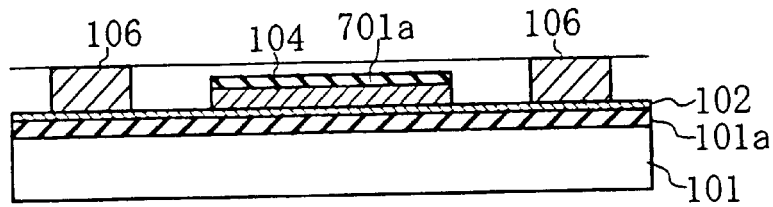

After that, as in FIG. 1C, a resist pattern is formed, and the metal pattern 106 made of a gold plating film is formed by electroplating (FIG. 7F). The resist pattern is removed (FIG. 7G). FIG. 7G corresponds to the state shown in FIG. 5D. Then, in accordance with the same procedure as in FIGS. 1E to 3B, the surface shape recognition sensor shown in FIG. 5E is formed. Alternatively, in accordance with the same procedure as shown in FIGS. 1E to 2F and 4A to 4C, the surface shape recognition sensor as shown in FIG. 5E may be formed.

The dielectric film 701 may also be formed from any other insulating material such as a silicon nitride film as long as it is not etched in etching the gold, titanium, and sacrificial films or it is etched only in a small amount.

In this surface shape recognition sensor as well, the electrode dielectric film is formed on the lower electrode. Hence, even when the deformable electrode is largely deflected downward, the lower portion of the deformable electrode is prevented from coming into electrical contact with the lower electrode. To prevent the contact between the lower electrode and the deformable electrode, the interval between these electrodes is increased more than necessity. This may decrease the resultant electrostatic capacitance and degrade the sensitivity. However, according to the surface shape recognition sensor shown in FIG. 5E, since the interval between the lower electrode and the deformable electrode can be reduced, the sensitivity is not degraded. When the interval is increased, and an excess pressure is applied to the deformable electrode in this state, the deformable electrode may cause plastic deformation and be unable to return to the original state. However, the surface shape recognition sensor of this embodiment can also suppress this problem.

In this embodiment as well, in the surface shape recognition sensor for which a hollow structure can easily be formed by forming the opening portions in the deformable electrode, the protective film can more easily be formed on the deformable electrode by a generally used method that is easy to apply.

The operation of the surface shape recognition sensor whose manufacturing process has been described in the above embodiments will be described next.

Figure 8A:
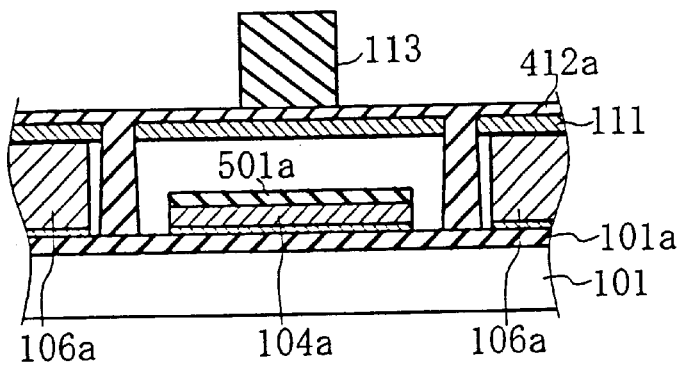
FIGS. 8A and 8B are schematic sectional views for explaining the operative states of a surface shape recognition sensor according to still another embodiment of the present invention.
Figure 8B:
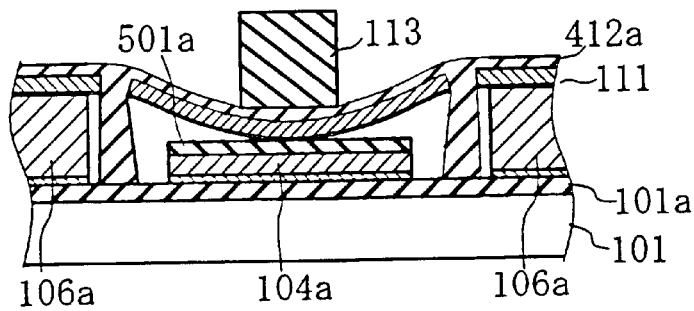

FIGS. 8A and 8B show the operation principle of the surface shape recognition sensor. An object such as a finger to be subjected to surface shape recognition is pressed against sensor chips that are two-dimensionally arrayed on the surface shape recognition sensor. At this time, a recess of the object having a three-dimensional pattern does not come into contact with the surface shape recognition sensor (FIG. 8A). On the other hand, a projection of the object comes into contact with the upper portion of the surface shape recognition sensor to apply a pressure to the projection 113 (FIG. 8B). The deformable electrode 111 is deflected in accordance with the magnitude of the pressure.

When the deformable electrode 111 is deflected, the electrostatic capacitance formed between the deformable electrode 111 and the lower electrode 104a increases. The increase amount of the electrostatic capacitance is detected by an integrated circuit (not shown) on the substrate 101. In addition, the change amount of the electrostatic capacitance is converted into halftone data to detect the surface shape.

In this operation, if a large external force is applied, the deformable electrode 111 is deflected toward the lower electrode 104a. According to this embodiment, since the electrode dielectric film 501a is formed, the deformable electrode 111 can be prevented from coming into contact with the lower electrode 104a.

Hence, any short-circuit between the deformable electrode 111 and the lower electrode 104a due to contact can be avoided. Additionally, the metal surfaces of the deformable electrode 111 and lower electrode 104a are prevented from coming into tight contact with each other.

Furthermore, since the electrode dielectric film 501a is made of a dielectric material, the change amount of the electrostatic capacitance formed between the deformable electrode 111 and the lower electrode 104a can be increased. When the electrode dielectric film 501a is set to an appropriate thickness, and an upper limit is given to the deformable depth of the deformable electrode 111, any mechanical fatigue and destruction of the deformable electrode 111 due to deformation can be prevented.

Figure 9A:
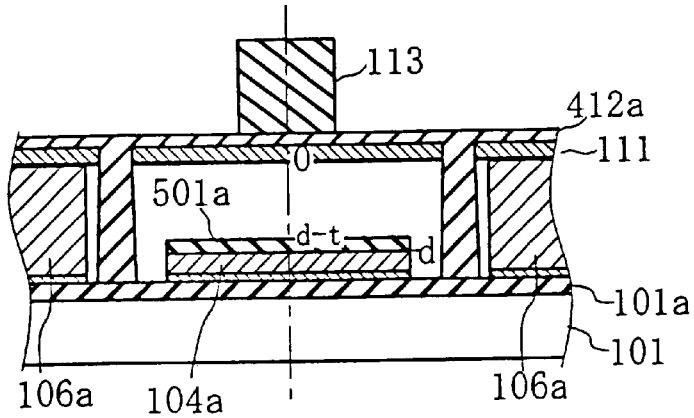
FIGS. 9A and 9B are schematic sectional views for explaining the operative states of a surface shape recognition sensor according to still another embodiment of the present invention.
Figure 9B:
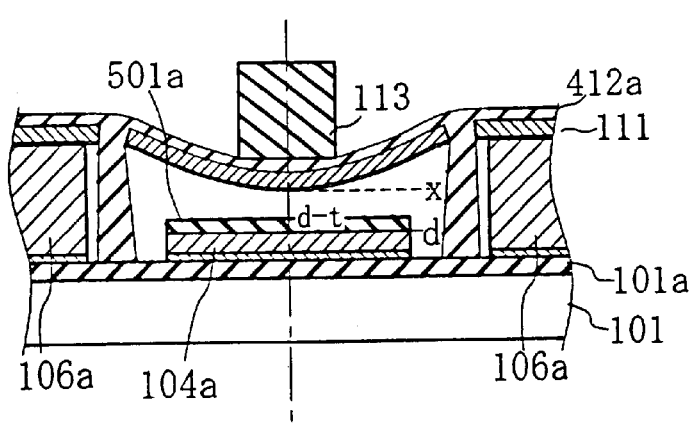

An electrode dielectric film design method for realizing the above advantages will be described next. For the simplicity, as shown in FIG. 9A, an axis is set while defining the direction in which the deformable electrode 111 is deflected as a positive direction and an origin at the center of the deformable electrode 111 when no pressure is applied. Let t be the thickness of the electrode dielectric film 501a, and (d−t) be the interval between the deformable electrode 111 and the electrode dielectric film 501a. In addition, let x be the position at which the deformable electrode 111 is deflected by an external pressure, as shown in FIG. 9B.

Figure 10A:
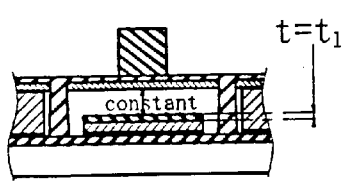
FIGS. 10A to 10C are schematic sectional views for explaining the operative states of a surface shape recognition sensor according to still another embodiment of the present invention.
Figure 10B:
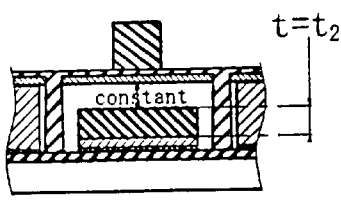
Figure 10C:
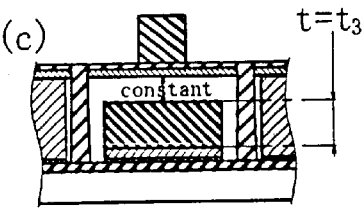
Figure 10D:
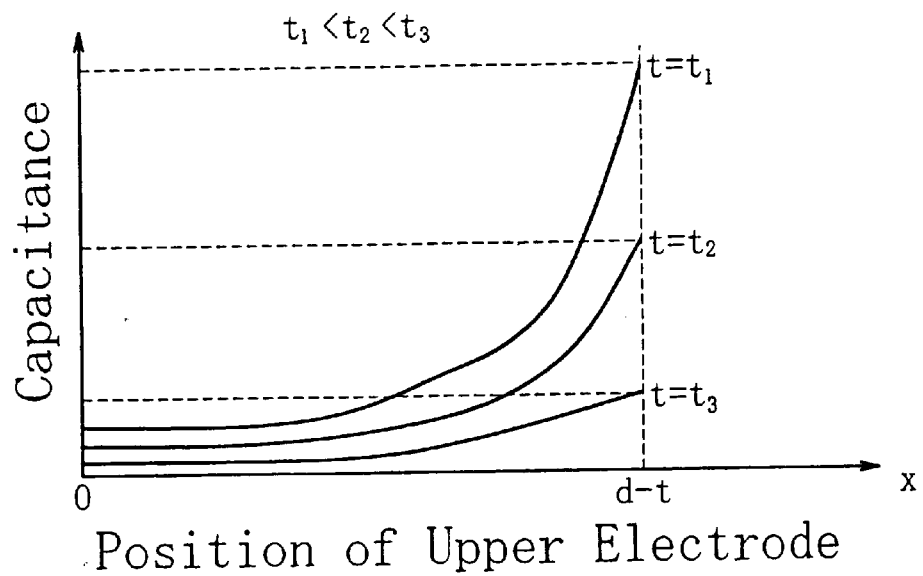
FIG. 10D is a graph showing the characteristic of the surface shape recognition sensor according to the embodiment shown in FIGS. 10A to 10C.

First, a case wherein the deformable depth (d−t) of the deformable electrode (upper electrode) 111 is set constant, and the thickness of the electrode dielectric film 501a is changed, as shown in FIGS. 10A, 10B, and 10C, will be examined. FIG. 10D shows a change in electrostatic capacitance in this state when the deformable electrode 111 is moved from a position x=0 to a position x=d−t. As is apparent from FIG. 10D, the thinner the electrode dielectric film 501a becomes, the wider the dynamic range of the electrostatic capacitance becomes.

Figure 11A:
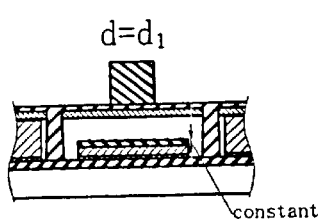
FIGS. 11A to 11C are schematic sectional views for explaining the operative states of a surface shape recognition sensor according to still another embodiment of the present invention.
Figure 11B:
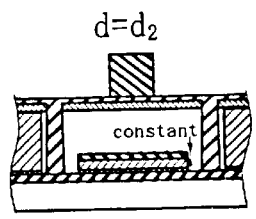
Figure 11C:
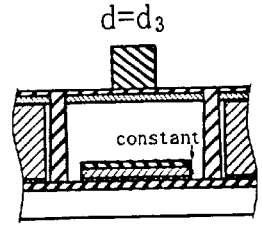
Figure 11D:
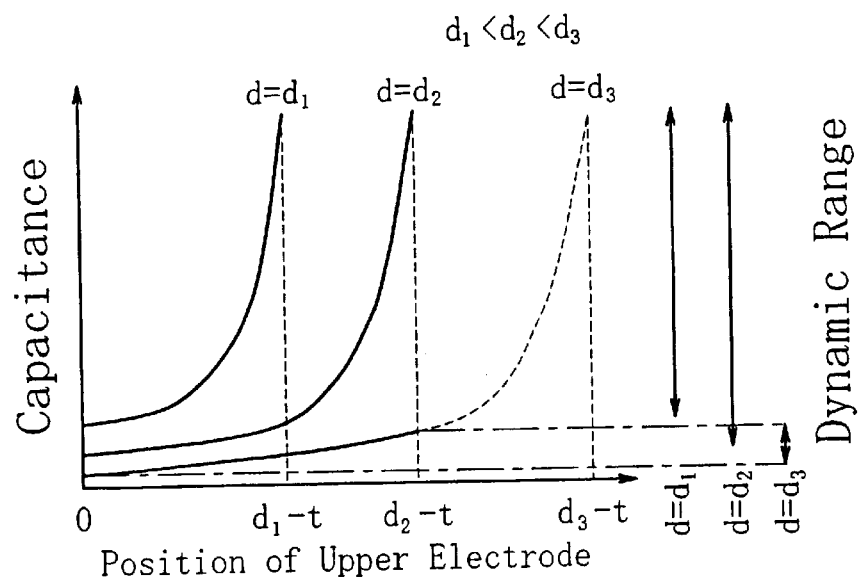
FIG. 11D is a graph showing the characteristic of the surface shape recognition sensor according to the embodiment shown in FIGS. 11A to 11C.

Next, a case wherein the thickness of the electrode dielectric film 501a is set constant, and the deformable depth of the deformable electrode 111 is changed ($d_1-t<d_2-t<d_3-t$), as shown in FIGS. 11A, 11B, and 11C, will be examined. FIG. 11D shows a change in electrostatic capacitance in this state when the deformable electrode 111 is moved from x=0 to a possible value.

To make the device function as a sensor, the deformable electrode must deform when a pressure is applied and return to the original state before deformation when no pressure is applied. The deformable electrode has a certain threshold value. When the deformation amount has that value or less, elastic deformation occurs so that the deformable electrode can return to the original state. However, when the deformation amount exceeds that value, plastic deformation occurs, and the deformable electrode cannot return to the original state.

Referring to FIG. 1D, the moving amount of the deformable electrode, which serves as the threshold value between elastic deformation and plastic deformation, is represented by $d_2-t$. When $0 \leq x \leq d_2-t$, elastic deformation occurs. When $d_2-t \leq x$, plastic deformation occurs. Hence, even when $d=d_3$, i.e., the distance between the deformable electrode 111 and the electrode dielectric film 501a is large, the deformable range of the sensor is $0 \leq x \leq d_2-t$. For this reason, the dynamic range of the electrostatic capacitance is maximized when $d=d_2$, as is apparent from FIG. 11D. That is, the dynamic range is maximized when the deformable electrode can deform at maximum within the range of elastic deformation.

A case wherein the thickness of the electrode dielectric film 501a and the deformable depth of the deformable electrode 111 are set constant, and a dielectric constant E of the electrode dielectric film is changed will be examined. When electrode dielectric films having different permittivities $\epsilon_3 < \epsilon_2 < \epsilon_1$ are used, as shown in FIGS. 12A, 12B, and 12C, the electrostatic capacitances have dynamic ranges corresponding to the permittivities, as shown in FIG. 12D. That is, the higher the dielectric constant of the electrode dielectric film becomes, the wider the dynamic range of the electrostatic capacitance in the sensor becomes.

Figure 13A:
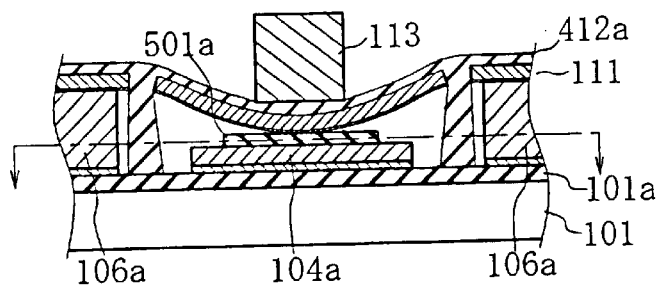
FIG. 13A is a schematic sectional view for explaining the state of a surface shape recognition sensor according to still another embodiment of the present invention.
Figure 13B:
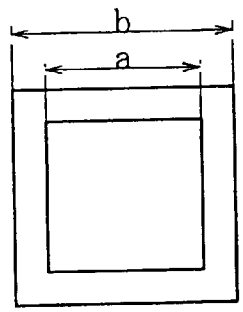
FIG. 13B is a schematic plan view for explaining the state of the surface shape recognition sensor according to the embodiment shown in FIG. 13A.

The shape of the electrode dielectric film 501a will be described next. Both the lower electrode 104a and electrode dielectric film 501*a* are formed into square shapes, and an axis is set by defining the centers of the squares as an origin, as shown in FIG. 13A. FIG. 13B shows the lower electrode 104*a* and electrode dielectric film 501*a* in FIG. 13A, which are viewed from the upper side. The lower electrode 104*a* has a square shape having sides b, and the electrode dielectric film 501*a* has a square shape having sides a.

Figure 13C:
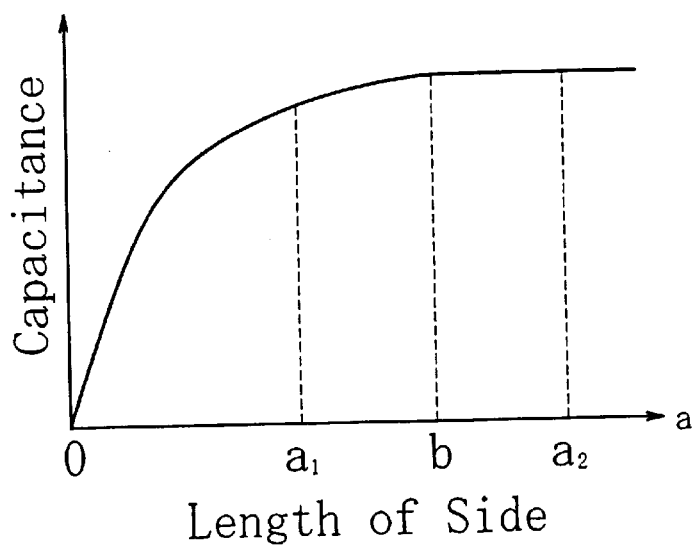
FIG. 13C is a graph showing the characteristic of the surface shape recognition sensor according to the embodiment shown in FIGS. 13A and 13B.

FIG. 13C shows the electrostatic capacitance formed between the lower electrode 104*a* and the deformable electrode 111 in this structure when a is increased from 0. The electrostatic capacitance when $0 \leq a \leq b$ and $a = a_1$ is smaller than that when a=b. The electrostatic capacitance when a>b and $a = a_2$ equals that when a=b. In a region where a>b, the electrostatic capacitance between the lower electrode 104*a* and the support electrode 106*a* undesirably increases.

For the above reasons, the electrode dielectric film 501*a* is formed to appropriately cover the lower electrode 104*a*. In the actual process, since it is difficult to form the electrode dielectric film and lower electrode into completely congruent shapes, a margin of about 1 $\mu$m is taken into consideration. In FIGS. 13A, 13B, and 13C, the lower electrode 104*a* is assumed to have a square shape. However, the above facts can apply even to a structure having another shape.

The above description will be summarized. To amplify and detect the difference between the external recess and projection at a high sensitivity, the dynamic range of the electrostatic capacitance is preferably wide. For this purpose, the electrode dielectric film 501*a* is formed as thin as possible. The electrode dielectric film is formed into a shape congruent with the lower electrode 104*a*. The surface of the electrode dielectric film 501*a* is formed at a position at which the deformable electrode 111 does not exceed the limit of elastic deformation.

In the above-described embodiments, the opening portions 111*a* are laid out at the four corners of a rectangular region (cell region) of the deformable electrode 111, which is surrounded by the lattice-shaped support electrode 106*a*, as shown in FIG. 2F. However, the present invention is not limited to this.

Figure 14A:
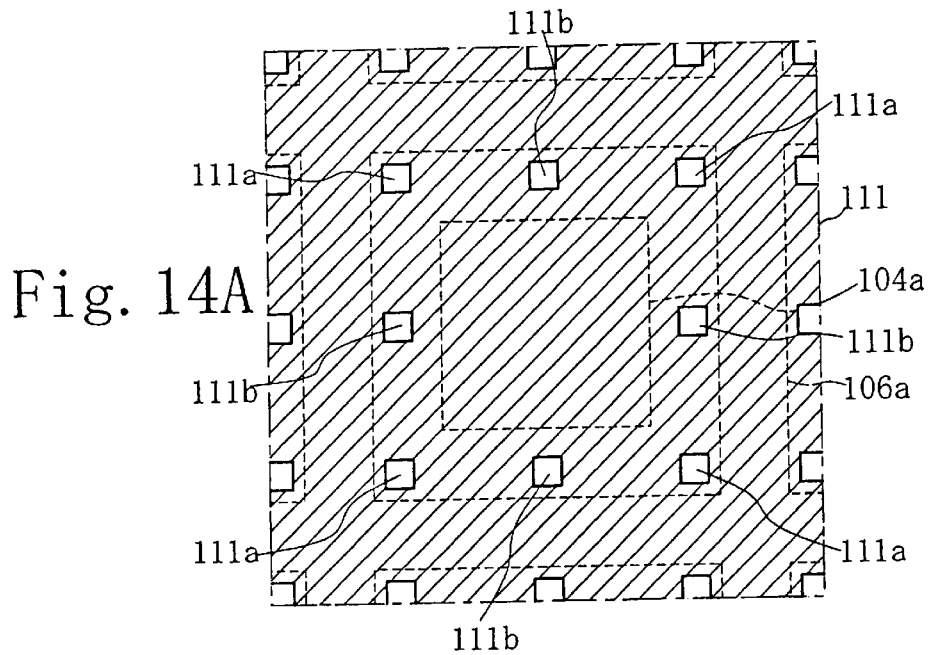
FIGS. 14A and 14B are plan views showing the structure of a deformable electrode of a surface shape recognition sensor according to still another embodiment of the present invention.
Figure 14B:
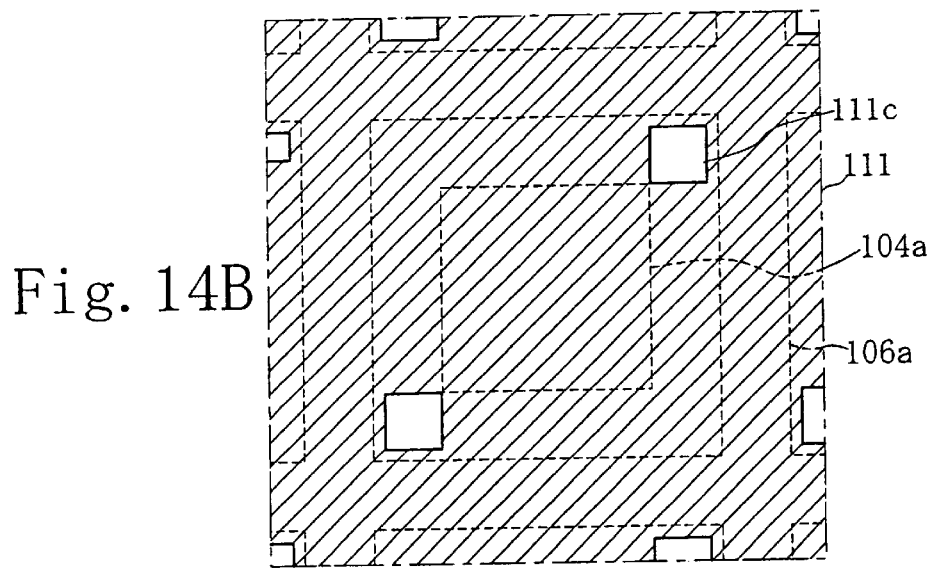
Figure 15:
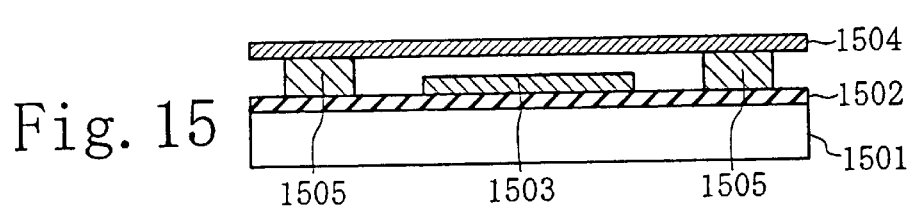
FIG. 15 is a schematic sectional view showing the structure of a surface shape recognition sensor having a deformable electrode.

For example, as shown in FIG. 14A, in addition to the opening portions 111*a* laid out at the four corners, opening portions 111*b* may be laid out on the line segments of a polygon defined by the opening portions 111*a* serving as vertices in a cell region of the deformable electrode 111. Alternatively, as shown in FIG. 14B, opening portions 111*c* may be laid out at two opposing corners in a cell region of the deformable electrode 111. The area of each opening portion 111*c* is set to be larger than that of the opening portion 111*a* or 111*b*.

Opening portions formed in the deformable electrode (upper electrode) to remove the sacrificial film is laid out in a region other than regions on the main part of the lower electrode and on the support electrode, as described above. It is only necessary that the movement of the deformable electrode is not impeded even when the material of the protective film enters the space under the deformable electrode from the opening portions that are thus formed in the deformable electrode. For example, when the opening portions only partially overlap the upper edge portion of the lower electrode, the movement of the deformable electrode is not impeded by the part of the protective film that has entered from the opening portions.

As has been described above, according to the present invention, since the opening portions of the upper electrode, which are formed to remove the sacrificial film under the upper electrode, are laid out in a region other than regions above the main part of the lower electrode and on the support electrode, the protective film can more easily be formed on the upper electrode by a generally used method such as coating or CVD that is easy to apply.

What is claimed is:

1. A surface shape recognition sensor comprising:
   a plurality of capacitive detection elements formed from lower electrodes and a deformable plate-like upper electrode made of a metal, the lower electrodes being insulated and isolated from each other and stationarily laid out on a single plane of an interlevel dielectric formed on a semiconductor substrate, and the upper electrode being laid out above the lower electrodes at a predetermined interval and having a plurality of opening portions;
   a support electrode laid out around the lower electrodes while being insulated and isolated from the lower electrodes, and formed to be higher than the lower electrodes to support the upper electrode;
   a protective film formed on the upper electrode to close the opening portions,
   wherein the opening portions of the upper electrode are laid out in a region other than regions on a main part of the lower electrode and on said support electrode; and
   a projection laid out in a region on said protective film above the lower electrode.

2. A sensor according to claim 1, wherein the opening portions of the upper electrode are laid out in a region other than a region on the lower electrode and a region on said support electrode.

3. A sensor according to claim 1, wherein said support electrode is made of a metal.

4. A sensor according to claim 1, wherein
   said sensor comprises an electrode dielectric film laid out in the lower electrode, and
   the upper electrode is laid out above said electrode dielectric film at a predetermined interval.

5. A sensor according to claim 4, wherein letting A be a moving amount of a central portion of the upper electrode when the upper electrode deforms at maximum within an elastic deformation range, the interval between the upper electrode and said electrode dielectric film is not more than A.

6. A sensor according to claim 4, wherein said electrode dielectric film is formed into substantially the same shape as that of the lower electrode and laid out to cover the lower electrode.

* * * * *